D. T. SEALE.
WAGON.
APPLICATION FILED APR. 17, 1912.
1,107,118.
Patented Aug. 11, 1914.
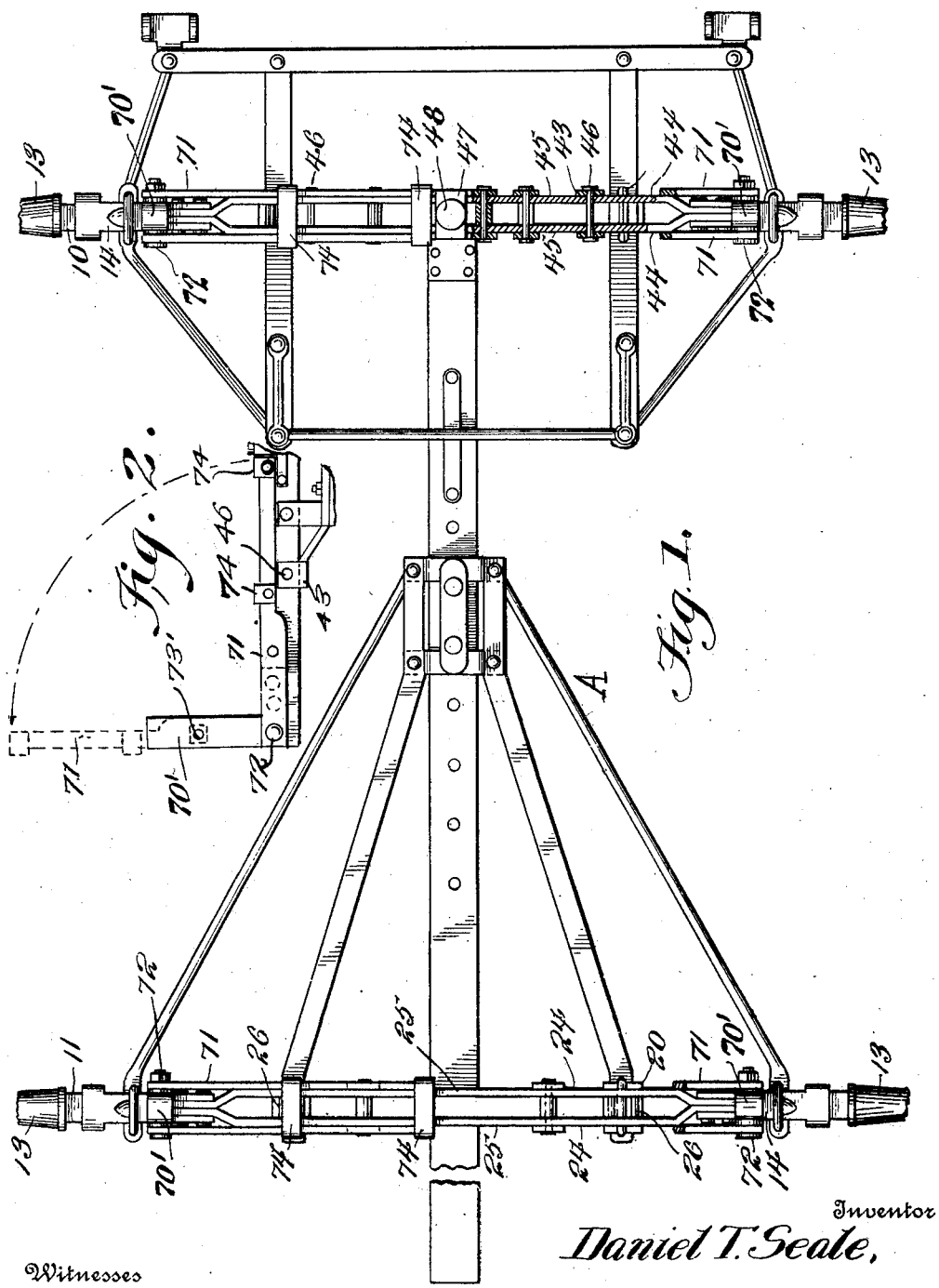

UNITED STATES PATENT OFFICE.

DANIEL T. SEALE, OF FLORALA, ALABAMA.

WAGON.

1,107,118. Specification of Letters Patent. Patented Aug. 11, 1914.

Application filed April 17, 1912. Serial No. 691,283.

*To all whom it may concern:*

Be it known that I, DANIEL T. SEALE, a citizen of the United States, residing at Florala, in the county of Covington and State of Alabama, have invented new and useful Improvements in Wagons, of which the following is a specification.

The invention relates to gears, and more particularly to the class of stanchions for vehicles.

The primary object of the invention is the provision of a stanchion wherein the same can swing to vertical or horizontal position, the stanchion being connected to a wagon bolster which is of a particular form to permit the swinging of the said stanchion.

Another object of the invention is the provision of a stanchion of this character which is strong, simple in construction, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—Figure 1 is a top plan view of the vehicle gear showing the stanchion constructed in accordance with the invention. Fig. 2 is a fragmentary side elevation of one of the stanchions, showing by full lines the same in lowered position and by dotted lines in raised position.

Similar reference characters indicate corresponding parts throughout the several views in the drawing.

Referring to the drawing in detail, A designates generally a vehicle gear including front and rear axles 10 and 11 respectively constructed from metal in the form of bars which may be preferably made from steel with a view of acquiring maximum strength, and carried at opposite ends of the said axle are removable axle skeins 13 which may be of any desired type. Mounted upon the front and rear axles 10 and 11 are spanning bars 14 which serve to support front and rear bolsters hereinafter described.

The rear bolster comprises a pair of bars 24, the same being formed with outwardly bowed medial portions 25 which are riveted or otherwise secured at 26 to the sides of suitable clips 20, while the ends of the said bars are brought together and riveted or otherwise secured in any suitable manner.

The front bolster comprises a pair of bars 44 having outwardly bowed medial portions 45, the ends of the bars 44 being brought together and riveted or otherwise secured in any suitable manner, and the bowed portions thereof are riveted at 46 to suitable clips 43. Fixed centrally to the side bars 45 of the front bolster is a bridge piece 47 through which is passed a removable king bolt 48 for connecting the front axle to the said bolster.

The front and rear bolster have fixed at their outer ends vertical standards 70' which are stationary and lie outside of the side boards of a wagon box, while pivoted to said standards at their inner end portions are vertical swinging stanchions 71 which are supported upon pivots 72 connecting them to the said standards, the stanchions being designed to normally lie parallel with the cross bolsters when in their lowered position, and carry cross straps 74 which are designed to rest against the bolsters to limit the inward swinging movement of the said stanchions. It is to be understood that the stanchions may swing upwardly into parallel relation with the standards 70' so that the side boards of the body of a vehicle can be built up. When the stanchions 71 are in perpendicular position or parallel with the standards 70', any suitable fasteners as at 73' may be passed through the same for holding the stanchions in said position. The stanchions when lowered onto the bolsters will have superposed thereon the body of the wagon.

From the foregoing it is thought that the construction and manner of operation of the invention will be clearly understood, and therefore a more extended explanation has been omitted.

What is claimed is:—

1. The combination with a wagon bolster having a pair of bars formed with medial separated portions and contracted ends, standards permanently fixed to the contracted ends of the bars and rising vertically therefrom, stanchions pivoted to the standards and adapted to swing into parallel relation with said bars on the lowering thereof and also to swing into parallel relation to the standards when raised, and cross straps mounted upon the stanchions and engageable with the bars for limiting the swinging movement of the stanchions in one direction and also to serve as bearings therefor when lowered in parallel relation to the bars.

2. The combination with a wagon bolster having a pair of bars formed with medial separated portions and contracted ends, standards permanently fixed to the contracted ends of the bars and rising vertically therefrom, stanchions pivoted to the standards and adapted to swing into parallel relation with said bars on the lowering thereof and also to swing into parallel relation to the standards when raised, cross straps mounted upon the stanchions and engageable with the bars for limiting the swinging movement of the stanchions in one direction and also to serve as bearings therefor when lowered in parallel relation to the bars, and means detachably engageable with the stanchions and the standards for holding the same in parallel relation thereto after the stanchions have been raised.

In testimony whereof I affix my signature in presence of two witnesses.

DANIEL T. SEALE.

Witnesses:
E. EDMONSTON, Jr.,
FRANK O. PARKER.

Copies of this patent may be obtained for five cents each, by addressing the "Commissioner of Patents, Washington, D. C."